United States Patent
Kung et al.

(10) Patent No.: US 10,437,388 B2
(45) Date of Patent: Oct. 8, 2019

(54) TOUCH DISPLAY SCREEN AND TOUCH DRIVING DETECTION METHOD THEREOF FOR DYNAMICALLY ADJUSTING POTENTIALS OF TOUCH OR DISPLAY DRIVING SIGNALS

(71) Applicant: FOCALTECH ELECTRONICS, LTD., Grand Cayman (KY)

(72) Inventors: Chen-Pang Kung, Guangdong (CN); Hua Li, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 58 days.

(21) Appl. No.: 15/937,749

(22) Filed: Mar. 27, 2018

(65) Prior Publication Data

US 2018/0284942 A1    Oct. 4, 2018

(30) Foreign Application Priority Data

Mar. 29, 2017 (CN) .......................... 2017 1 0197530

(51) Int. Cl.
*G06F 3/044* (2006.01)
*G06F 3/041* (2006.01)
*G06F 3/0488* (2013.01)

(52) U.S. Cl.
CPC ............ *G06F 3/0418* (2013.01); *G06F 3/044* (2013.01); *G06F 3/0412* (2013.01); *G06F 3/0416* (2013.01); *G06F 3/04883* (2013.01)

(58) Field of Classification Search
CPC .... G06F 3/0418; G06F 3/0416; G06F 3/0412; G06F 3/04883; G06F 3/044
See application file for complete search history.

(56) References Cited

U.S. PATENT DOCUMENTS

| | | | |
|---|---|---|---|
| 8,537,126 B2 * | 9/2013 | Yousefpor | G06F 3/0416 345/173 |
| 9,310,916 B2 * | 4/2016 | Krah | G06F 3/0412 |
| 2011/0157064 A1 * | 6/2011 | Imai | G06F 3/0416 345/173 |
| 2012/0113064 A1 * | 5/2012 | White | G06F 3/0412 345/178 |
| 2013/0215075 A1 * | 8/2013 | Lee | G06F 3/044 345/174 |
| 2013/0257518 A1 * | 10/2013 | Hou | H03K 17/962 327/517 |

(Continued)

*Primary Examiner* — Darlene M Ritchie
(74) *Attorney, Agent, or Firm* — Yue (Robert) Xu; Apex Attorneys at Law, LLP (57) ABSTRACT

A touch display screen and a touch driving detection method thereof are provided. The touch display screen includes a touch module and a display module. The touch module includes a touch electrode unit and a touch driving detection unit, a touch signal for acquiring a change in capacitance is transmitted between the touch driving detection unit and the touch electrode unit. The display module includes a display electrode unit and a display driving unit, the display driving unit transmits a display driving signal to the display electrode unit. A potential of the touch signal is dynamically adjusted based on potential information of the display driving signal of the display driving unit, or a potential of the display driving signal is dynamically adjusted based on potential information of the touch signal of the touch driving detection unit.

20 Claims, 8 Drawing Sheets

(56) References Cited

U.S. PATENT DOCUMENTS

| | | | |
|---|---|---|---|
| 2014/0218331 A1* | 8/2014 | Chang | G06F 3/044 |
| | | | 345/174 |
| 2015/0042597 A1* | 2/2015 | Wang | G06F 3/044 |
| | | | 345/174 |
| 2016/0092027 A1* | 3/2016 | Lee | G06F 3/044 |
| | | | 345/174 |
| 2016/0246429 A1* | 8/2016 | Ma | G06F 3/0412 |
| 2017/0168644 A1* | 6/2017 | Kang | G06F 3/0412 |
| 2018/0032196 A1* | 2/2018 | Lin | G06F 3/0412 |
| 2018/0136778 A1* | 5/2018 | Choi | G06F 3/0412 |
| 2018/0224964 A1* | 8/2018 | Church | G06F 3/044 |

* cited by examiner

| Polarizer | PR6 |
| Touch electrode unit | PR1 |
| Thin film package layer | PR3 |
| Display electrode unit | PR2 |
| Display medium layer | PR4 |
| Display TFT electrode substrate | PR5 |

TOUCH DISPLAY SCREEN AND TOUCH DRIVING DETECTION METHOD THEREOF FOR DYNAMICALLY ADJUSTING POTENTIALS OF TOUCH OR DISPLAY DRIVING SIGNALS

CROSS REFERENCE TO RELATED APPLICATION

The present application claims priority to Chinese Patent Application No. 201710197530.3, titled "TOUCH DISPLAY SCREEN AND TOUCH DRIVING DETECTION METHOD THEREOF", filed on Mar. 29, 2017 with the State Intellectual Property Office of People's Republic of China, which is incorporated herein by reference in its entirety.

FIELD

The present disclosure relates to a signal processing device and a signal processing method thereof, and in particular to a touch display screen and a signal processing method thereof.

BACKGROUND

In the conventional technology, a touch display screen is formed by providing a capacitive touch device on an infrastructure of a display screen, and the touch display screen includes a touch module and a display module. The touch module is provided with a touch electrode unit configured to form a touch capacitor. The display module is provided with a display electrode unit configured to implement an image display. As the capacitive touch display screen is becoming thinner, a gap between the touch electrode unit and the display electrode unit is getting smaller and has reached a micrometer scale. A capacitive effect is generated between the touch electrode unit and the display electrode unit due to the gap, such that the touch electrode unit and the display electrode unit independent from each other are influenced with each other.

Figure 14:
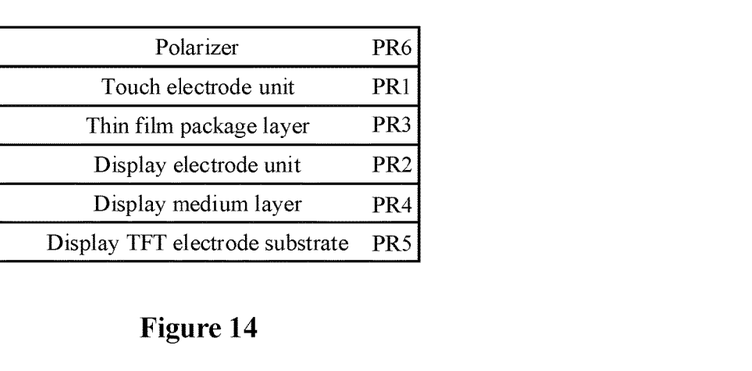
FIG. 14 is a schematic diagram showing a stacked structure of an AMOLED touch display screen according to the conventional technology.
Figure 15:
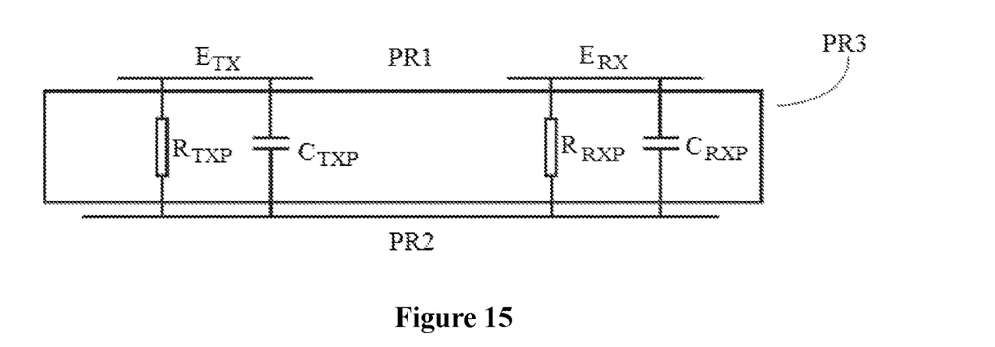
FIG. 15 is a schematic diagram showing an electrical model of a touch electrode unit PR1 and a display electrode unit PR2 of the AMOLED touch display screen according to the conventional technology.

Taking the case of using an active matrix organic light emitting diode display screen (hereinafter simply referred to as an AMOLED display screen) as a basis for constructing a capacitive touch display screen as an example, as shown in FIG. 14, the AMOLED touch display screen includes a display electrode unit PR2, a display medium layer PR4 and a display thin film transistor electrode substrate (simply referred to as a display TFT electrode substrate) PR5 which are stacked. A touch electrode unit PR1 is provided on the display electrode unit PR2, a thin film package layer PR3 is arranged between the display electrode unit PR2 and the touch electrode unit PR1, and a polarizer PR6 covers the touch electrode unit PR1. Taking the case where the touch electrode unit PR1 is implemented using a mutual-capacitance touch principle as an example, as shown in FIG. 15, the touch electrode unit PR1 includes a driving electrode $E_{TX}$ and a sensing electrode $E_{RX}$. Since a thickness of the thin film package layer PR3 is less than 10 μm, a thin film package resistance and an equivalent capacitance are generated between the touch electrode unit PR1 and the display electrode unit PR2. A thin film package resistance $R_{TXP}$ and an equivalent capacitance $C_{TXP}$ are generated between the driving electrode $E_{TX}$ and the display electrode unit PR2, and a thin film package resistance $R_{RXP}$ and an equivalent capacitance $C_{RXP}$ are generated between the sensing electrode $E_{RX}$ and the display electrode unit PR2. As the AMO-LED touch display screen is becoming thinner, the thickness of the thin film package layer PR3 is further reduced, resulting in low thin film package resistances $R_{TXP}$ and $R_{RXP}$, which may cause electric leakage between the touch electrode unit PR1 and the display electrode unit PR2. Moreover, with effects of the equivalent capacitances $C_{TXP}$ and $C_{RXP}$, a driving efficiency of the touch module is decreased due to a potential difference between a reference potential applied to the touch driving electrode unit and a reference potential applied to the display driving electrode unit. The above factors may directly result in a longer response time of the touch electrode unit to a touch event or even an inaccurate detection on occurrence of a touch event.

In particular, for some current-driven display electrode units, a potential of a display driving signal applied to a display electrode unit is dynamically adjusted based on a change in a display luminance, and the touch electrode unit is seriously impacted by a changing potential of the display driving signal, and the touch module may not reflect an actual situation of a touch accurately.

SUMMARY

A technical problem to be solved by the present disclosure is to avoid the disadvantages of the conventional technology and propose a new touch display screen to reduce an influence of a display electrode unit on a touch electrode unit. A touch driving detection method is proposed together with the new touch display screen to reduce or even eliminate the influence of the display electrode unit on the touch electrode unit, and a system for configuring the touch display screen is further proposed.

The technical problem can be solved in the present disclosure by using the following technical solution. A touch driving detection method based on a touch display screen is proposed. The touch display screen includes a touch module and a display module. The touch module includes a touch electrode unit configured to construct a capacitive touch sensitive region and a touch driving detection unit configured to acquire a signal from the touch electrode unit and process the signal. A touch signal for acquiring a change in capacitance is transmitted between the touch driving detection unit and the touch electrode unit. The display module includes a display electrode unit configured to implement an image display and a display driving unit configured to drive the display electrode unit. The display driving unit transmits a display driving signal to the display electrode unit. The method includes establishing a potential information data channel between the touch driving detection unit and the display driving unit, such that the touch driving detection unit dynamically adjusts a potential of the touch signal based on potential information of the display driving signal of the display driving unit, or the display driving unit dynamically adjusts a potential of the display driving signal based on potential information of the touch signal of the touch driving detection unit.

The touch module may be a mutual-capacitance touch module based on a mutual-capacitance principle, and the touch signal may include a touch driving signal and a touch detection signal.

The touch module may be a self-capacitive touch module based on a self-capacitance principle, and the touch signal may include a touch driving signal.

As an implementation solution of the touch driving signal, the touch driving signal may include at least two driving potentials, and a predefined potential difference is set between any two of the driving potentials.

The touch driving signal may be a square wave signal, a sine wave signal, or a composite sine wave signal including a triangular wave signal. Peak values or valley values of the touch driving signal may be the driving potentials.

A reference manner of the display driving signal may be that the potential of the touch signal is dynamically adjusted by using the potential of the display driving signal as a peak potential reference potential. Another reference manner of the display driving signal may be that the potential of the touch signal is dynamically adjusted by using the potential of the display driving signal as an intermediate potential reference potential. Another reference manner of the display driving signal may be that the potential of the touch signal is dynamically adjusted by using the potential of the display driving signal as a valley potential reference potential.

The touch module may be the mutual-capacitance touch module based on the mutual-capacitance principle, the touch electrode unit may be a mutual-capacitance touch electrode unit which constructs a mutual-capacitance touch sensitive region based on the mutual-capacitance principle, the touch electrode unit may include one or more touch electrodes, each of the touch electrodes may be configured to form a touch capacitor, and the touch detection signal may be used to detect a signal quantity of the touch driving signal after the touch driving signal is coupled by the touch capacitor. Alternatively, the touch module may be the self-capacitance touch module based on the self-capacitance principle, the touch electrode unit may be a self-capacitance touch electrode unit which constructs a self-capacitance touch sensitive region based on the self-capacitance principle, the touch electrode unit may include one or more touch electrodes, and the touch detection signal may be used to detect a signal quantity of the touch driving signal after a touch capacitor is charged and discharged by the touch driving signal.

The technical problem can be solved in the present disclosure by using the following technical solution. A touch display screen is designed and manufactured, which includes a touch module and a display module. The touch module includes a touch electrode unit configured to construct a capacitive touch sensitive region and a touch driving detection unit electrically connected with the touch electrode unit. A touch signal for acquiring a change in capacitance is transmitted between the touch driving detection unit and the touch electrode unit. The display module includes a display electrode unit configured to implement an image display and a display driving unit electrically connected with the display electrode unit. The display driving unit transmits a display driving signal to the display electrode unit. In particular, the display driving unit is electrically connected with the touch driving detection unit to establish a data channel for transmitting potential information, such that the touch driving detection unit dynamically adjusts a potential of the touch signal based on potential information of the display driving signal of the display driving unit, or the display driving unit dynamically adjusts a potential of the display driving signal based on potential information of the touch signal of the touch driving detection unit.

As for a specific structure, the display driving unit may include a power control sub-unit electrically connected with the display electrode unit. The power control sub-unit is configured to provide the display driving signal to the display electrode unit. The power control sub-unit may be electrically connected with the touch driving detection unit to establish the data channel for transmitting potential information.

The touch driving detection unit may be an integrated circuit chip provided independently or a portion of an integrated circuit provided in an integrated circuit chip. The display driving unit may be an integrated circuit chip provided independently or a portion of an integrated circuit provided in an integrated circuit chip.

According to an implementation solution, the touch module may be a mutual-capacitance touch module based on a mutual-capacitance principle, the touch electrode unit may be a mutual-capacitance touch electrode unit which constructs a mutual-capacitance touch sensitive region based on the mutual-capacitance principle, the touch driving detection unit may be a mutual-capacitance touch driving detection unit, and the touch signal may include a touch driving signal and a touch detection signal. According to another implementation solution, the touch module may be a self-capacitance touch module based on a self-capacitance principle, the touch electrode unit may be a self-capacitance touch electrode unit which constructs a self-capacitance touch sensitive region based on the self-capacitance principle, the touch driving detection unit may be a self-capacitance touch driving detection unit, and the touch signal may include a touch driving signal.

As for an interface implementation, the display driving unit and the touch driving detection unit may be electrically connected with each other through analog signal interfaces of the display driving unit and the touch driving detection unit, to establish an analog data channel for transmitting potential information. Alternatively, the display driving unit and the touch driving detection unit may be electrically connected with each other through digital signal interfaces of the display driving unit and the touch driving detection unit, to establish a digital data channel for transmitting potential information.

As a specific implementation, the touch display screen may further include a thin film package layer. The display module may be an active matrix organic light emitting diode display module and may include a display medium layer and a display thin film transistor electrode substrate. The touch electrode unit and the display electrode unit may be stacked, and the thin film package layer may be arranged between the touch electrode unit and the display electrode unit.

The technical problem can be solved in the present disclosure by using the following technical solution. A system for configuring a touch display screen is designed and manufactured, which includes the touch display screen. The touch display screen includes a touch module and a display module. The touch module includes a touch electrode unit configured to construct a capacitive touch sensitive region and a touch driving detection unit electrically connected with the touch electrode unit. A touch signal for acquiring a change in capacitance is transmitted between the touch driving detection unit and the touch electrode unit. The display module includes a display electrode unit configured to implement an image display and a display driving unit electrically connected with the display electrode unit. The display driving unit transmits a display driving signal to the display electrode unit. The system further includes a system data processing module electrically connected with the touch driving detection unit and the display driving unit to establish a data channel for transmitting potential information, such that the touch driving detection unit dynamically adjusts a potential of the touch signal based on potential information of the display driving signal of the display driving unit, or the display driving unit dynamically adjusts a potential of the display driving signal based on potential information of the touch signal of the touch driving detection unit.

The touch driving detection unit may be an integrated circuit chip provided independently or a portion of an integrated circuit provided in an integrated circuit chip. The display driving unit may be an integrated circuit chip provided independently or a portion of an integrated circuit provided in an integrated circuit chip.

According to an implementation solution, the touch module may be a mutual-capacitance touch module based on a mutual-capacitance principle, the touch electrode unit may be a mutual-capacitance touch electrode unit which constructs a mutual-capacitance touch sensitive region based on the mutual-capacitance principle, the touch driving detection unit may be a mutual-capacitance touch driving detection unit, and the touch signal may include a touch driving signal and a touch detection signal. According to another implementation solution, the touch module may be a self-capacitance touch module based on a self-capacitance principle, the touch electrode unit may be a self-capacitance touch electrode unit which constructs a self-capacitance touch sensitive region based on the self-capacitance principle, the touch driving detection unit may be a self-capacitance touch driving detection unit, and the touch signal may include a touch driving signal.

As for an interface implementation, the display driving unit and the system data processing module may be electrically connected with each other through first signal interfaces of the display driving unit and the system data processing module, and the touch driving detection unit and the system data processing module may be electrically connected with each other through second signal interfaces of the touch driving detection unit and the system data processing module, to establish a data channel for transmitting potential information. Each of the first signal interfaces may be an analog signal interface or a digital signal interface; and each of the second signal interfaces may be an analog signal interface or a digital signal interface.

As a specific implementation, the touch display screen may further include a thin film package layer. The display module may be an active matrix organic light emitting diode display module and may include a display medium layer and a display thin film transistor electrode substrate. The touch electrode unit and the display electrode unit may be stacked, and the thin film package layer may be arranged between the touch electrode unit and the display electrode unit.

Compared with the conventional technology, the technical effect of the touch display screen and the touch driving detection method thereof according to the present disclosure is described as follows. Potential information are transmitted between the touch driving detection unit and the display driving unit, so that a potential of a transmission signal of one unit is dynamically adjusted based on a potential of a transmission signal of the other unit. In this way, a driving load is reduced and it is easy to design a touch driving circuit of the touch driving detection unit and a display driving circuit of the display driving unit, a potential difference between the touch electrode unit and the display electrode unit is reduced or even eliminated, influences of an equivalent capacitance between the touch electrode unit and the display electrode unit on a detection efficiency, a detection effect and a detection accuracy of touch are reduced, an electric leakage between a touch electrode and a display electrode is avoided, thereby adapting to a thinner touch display screen.

DETAILED DESCRIPTION

Detailed description is made in the following in conjunction with embodiments shown in the drawings.

Figure 1:
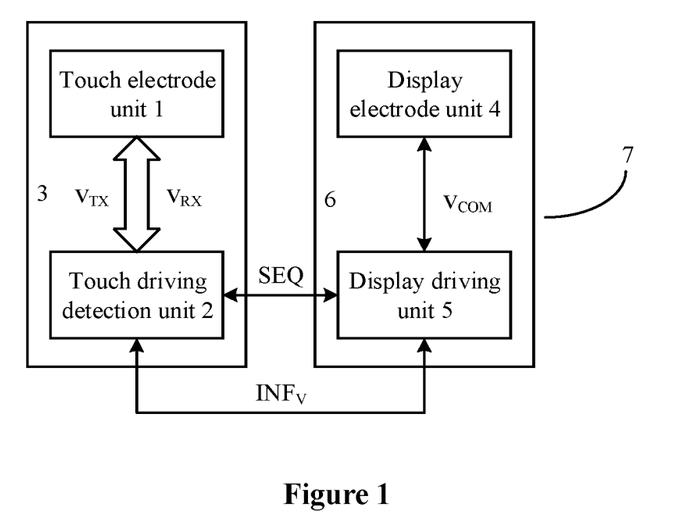
FIG. 1 is a schematic block diagram showing a circuit principle of a touch display screen according to the present disclosure.

A touch driving detection method based on a touch display screen 7 shown in FIG. 1 is provided according to the present disclosure. The touch display screen 7 includes a touch module 3 and a display module 6. The touch module 3 includes a touch electrode unit 1 configured to construct a capacitive touch sensitive region and a touch driving detection unit 2 configured to acquire a signal from the touch electrode unit 1 and process the signal. A touch signal for acquiring a change in capacitance is transmitted between the touch driving detection unit 2 and the touch electrode unit 1. The display module 6 includes a display electrode unit 4 configured to implement an image display and a display driving unit 5 configured to drive the display electrode unit 4. The display driving unit 5 transmits a display driving signal $v_{COM}$ to the display electrode unit 4.

In practice, the touch module 3 may be a mutual-capacitance touch module based on a mutual-capacitance principle or a self-capacitance touch module based on a self-capacitance principle. For the mutual-capacitance touch module, the touch signal includes a touch driving signal and a touch detection signal. For the self-capacitance touch module, the touch signal includes a touch driving signal.

According to the touch driving detection method of the present disclosure, a potential information data channel $INF_V$ is established between the touch driving detection unit 2 and the display driving unit 5, such that the touch driving detection unit 2 can dynamically adjust a potential of the touch signal based on potential information of the display driving signal $v_{COM}$ of the display driving unit 5, or the display driving unit 5 can dynamically adjust a potential of the display driving signal $v_{COM}$ based on potential information of the touch signal of the touch driving detection unit 2. Potential information transmitted through the potential information data channel $INF_V$ may be analog signal information or digital signal information. The potential information may be a specific signal waveform or may be potential value information. According to the embodiments of the present disclosure, with the potential information data channel $INF_V$, the touch driving detection unit 2 can dynamically adjust the potential of the touch signal based on the potential information of the display driving signal $v_{COM}$ of the display driving unit 5.

Taking the case where the touch module 3 is a mutual-capacitance touch module as an example, in the conventional technology, the touch driving signal $v_{TX}$ and the touch detection signal $v_{RX}$ of the touch driving detection unit 2 are independent from the display driving signal $v_{COM}$ of the display driving unit 5. According to the touch driving detection method of the present disclosure, a potential information data channel $INF_V$ is established between the touch driving detection unit 2 and the display driving unit 5, such that the touch driving detection unit 2 can dynamically adjust potentials of the touch driving signal $v_{TX}$ and the touch detection signal $v_{RX}$ based on the potential information of the display driving signal $v_{COM}$ of the display driving unit 5, or the display driving unit 5 can dynamically adjust a potential of the display driving signal $v_{COM}$ based on the potential information of the touch driving signal $v_{TX}$ and the touch detection signal $v_{RX}$ of the touch driving detection unit 2. The touch driving detection unit 2 controls and drives a driving electrode and a sensing electrode of the touch electrode unit 1 based on the potential information provided by the display driving unit 5, such that output signals of the driving electrode and the sensing electrode of the touch electrode unit 1 are related with the potential of the display driving signal of the display driving unit 5, that is, a reference potential applied to the driving electrode or the sensing electrode of the touch electrode unit 1 (that is, a reference potential of the touch driving signal $v_{TX}$ and a reference potential of the touch detection signal $v_{RX}$) may be identical with or related with a display driving potential applied to the display electrode of the display electrode unit 4 in a certain proportional relationship. In a case that the reference potentials of the touch driving signal $v_{TX}$ and the touch detecting signal $v_{RX}$ respectively applied to the driving electrode and the sensing electrode of the touch electrode unit 1 are identical with the display driving potential applied to the display electrode of the display electrode unit 4, it facilitates reduction of a driving load of the touch driving detection unit 2, therefore a driving circuit of the touch driving detection unit 2 is easy to be designed. In addition, with the potential information data channel $INF_V$, the display driving unit 5 can dynamically adjust the potential of the display driving signal $v_{COM}$ based on the potential information of the touch driving signal $v_{TX}$ and the touch detection signal $v_{RX}$ of the touch driving detecting unit 2, it facilitates reduction of the driving load of the display driving unit 5, therefore a driving circuit of the display driving unit 5 is easy to be designed. Furthermore, since a reference potential of a voltage applied to the touch electrode of the touch electrode unit 1 is identical with a potential of the display driving signal applied to the display electrode of the display electrode unit 4, there is no potential difference between the touch electrode unit 1 and the display electrode unit 4. In the case where the thin film package layer between the touch electrode unit 1 and the display electrode unit 4 is thin (which is usually less than 10 μm), electric leakage can be effectively avoided according to the present disclosure even if a thin film package insulating layer has a defect due to a manufacturing process or the material.

According to the first embodiment of the present disclosure, timing sequence information SEQ is also transmitted between the touch driving detection unit 2 and the display driving unit 5.

Figure 2:
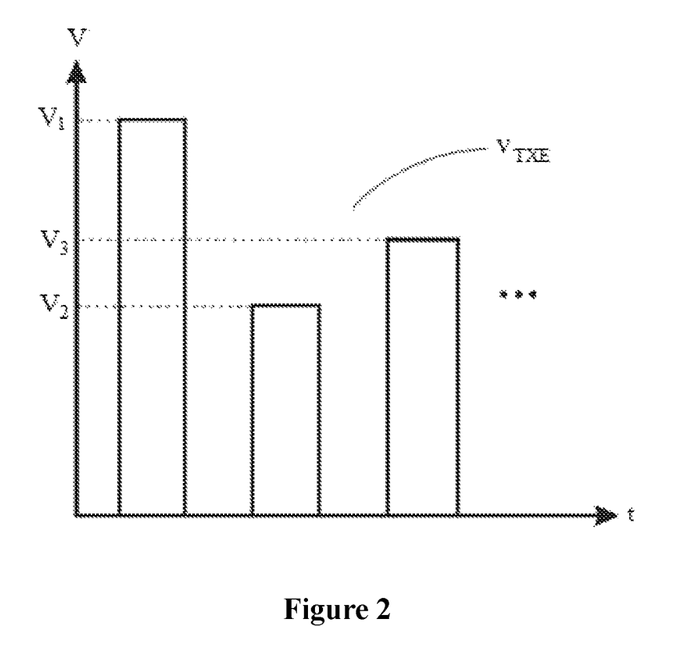
FIG. 2 is a schematic diagram showing an exemplary waveform of a touch driving signal $v_{TXE}$ according to a first embodiment of the present disclosure.
Figure 3:
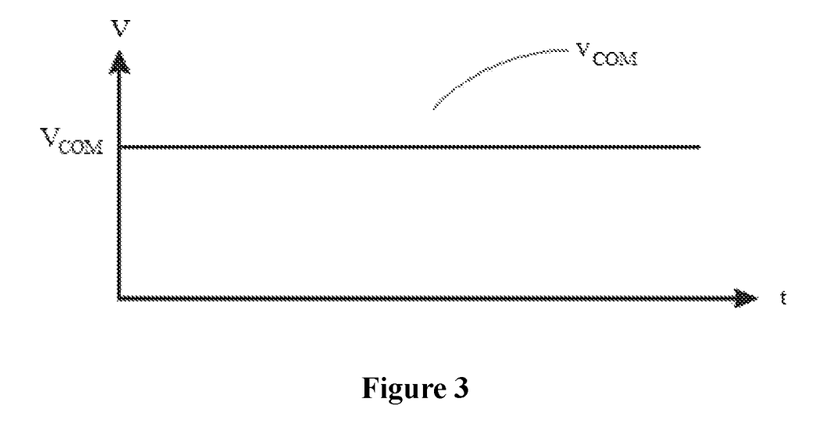
FIG. 3 is a schematic diagram showing a waveform of a display driving signal $v_{COM}$ according to the first embodiment of the present disclosure.
Figure 4:
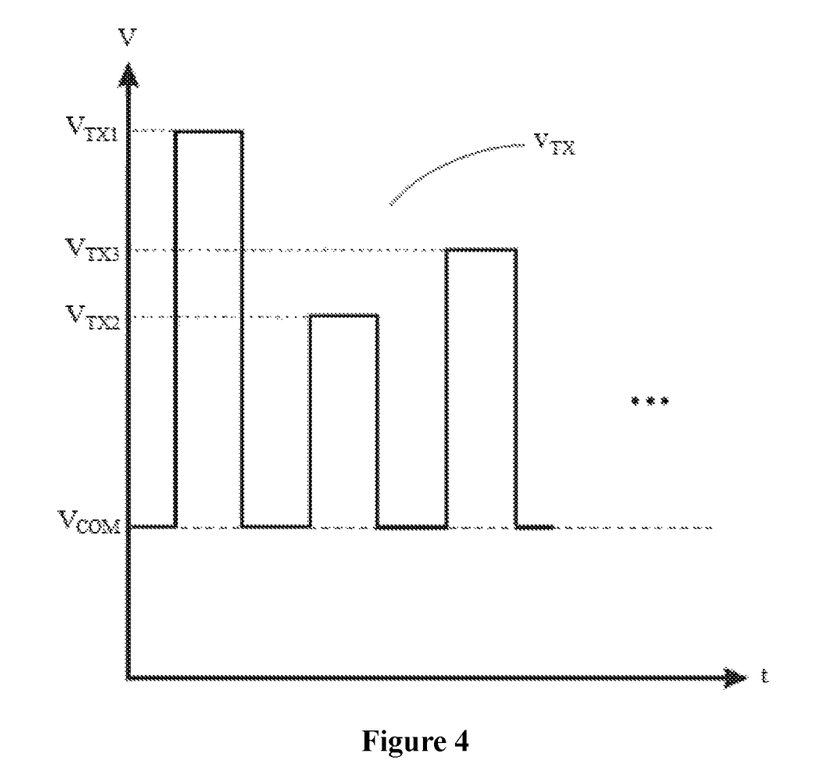
FIG. 4 is a schematic diagram showing a waveform of a touch driving signal $v_{TX}$ when using a display driving signal $v_{COM}$ as a valley potential reference potential according to the first embodiment of the present disclosure.

In the first embodiment of the present disclosure, a specific example is described to illustrate a case where the touch driving detection unit 2 can dynamically adjust the potential of the touch signal based on the potential information of the display driving signal $v_{COM}$ of the display driving unit 5 transmitted through the potential information data channel $INF_V$. In the first embodiment of the present disclosure, a case where the touch module 3 is a mutual-capacitance touch module is taken as an example to describe a case where the touch driving detection unit 2 can dynamically adjust the potential of the touch driving signal $v_{TX}$ based on the potential information of the display driving signal $v_{COM}$ of the display driving unit 5. The dynamic adjustment to the touch detection signal $v_{RX}$ of the mutual-capacitance touch module, the dynamic adjustment to the touch driving signal $v_{TX}$ of the self-capacitance touch module, and the dynamic adjustment to the display driving signal based on the potential information of the touch signal can be implemented by referring to the first embodiment. The touch driving signal $v_{TX}$ may be in the form of a signal whose peak value and valley value are fixed values relative to the reference potential, that is, there is only one peak value or valley value relative to the reference potential. In order to drive the touch electrode of the touch electrode unit 1 in multiple driving modes, the touch driving signal of the touch driving detection unit 2 in the first embodiment of the present disclosure is characterized in that: as shown by the example waveform in FIG. 2, the touch driving signal includes at least two driving potentials, a predefined potential difference is set between any two of the driving potentials, the potential difference is a fixed value once the potential difference is set and is not changed due to a change in the reference potential. The potential difference between two driving potentials is set by software or by hardware. The exemplary waveform $v_{TX}$ shown in FIG. 2 is not an actual waveform of the touch driving signal $v_{TX}$ of the present disclosure, but merely represents characteristics of multiple driving potentials of the touch driving signal. As shown in FIG. 2, the exemplary touch driving signal $V_{TXE}$ includes three driving potentials $V_1$, $V_2$ and $V_3$, with potential differences $U_{12}=V_1-V_2$, $U_{23}=V_2-V_3$ and $U_{31}=V_3-V_1$. The potential differences are driving voltages for driving the touch electrode. The three driving potentials $V_1$, $V_2$ and $V_3$ can be dynamically adjusted based on the potential information of the display driving signal $v_{COM}$, but the potential differences $U_{12}$, $U_{23}$ and $U_{31}$ among the three driving potentials are fixed values, such that the driving voltage applied to the touch electrode of the touch electrode unit 1 is stable, and a touch effect can be ensured. In a case where the display driving signal $v_{COM}$ of the display driving unit 5 is as shown in FIG. 3, the potential information of the display driving signal $v_{COM}$ is transmitted from the display driving unit 5 to the touch driving detecting unit 2 through the potential information data channel $INF_V$. According to the first embodiment of the present disclosure, the touch driving signal $v_{TX}$ is dynamically adjusted based on the potential information of the display driving signal $v_{COM}$ by using the potential $V_{COM}$ of the display driving signal $v_{COM}$ as the valley potential reference potential to form a waveform as shown in FIG. 4. Referring to FIG. 2, a first driving potential $V_{TX1}$ of the touch driving signal $v_{TX}$ is $V_{TX1}=V_1+V_{COM}$, a second driving potential $V_{TX2}$ of the touch driving signal $v_{TX}$ is $V_{TX2}=V_2+V_{COM}$, and a third driving potential $V_{TX3}$ of the touch driving signal $v_{TX}$ is $V_{TX3}=V_3+V_{COM}$. The driving potentials are dynamically adjusted based on the potential information of the display driving signal $v_{COM}$, such that electric leakage between the touch electrode unit 1 and the display electrode unit 4 and effect to driving efficiency can be avoided. The potential differences among the driving potentials remain unchanged, that is, $U_{12}=V_{TX1}-V_{TX2}=V_1-V_2$, $U_{23}=V_{TX2}-V_{TX3}=V_2-V_3$, and $U_{31}=V_{TX3}-V_{TX1}=V_3-V_1$, stability of the driving voltage is ensured. Analogously, the touch driving detection unit 2 can dynamically adjust the potential of the touch detection signal $v_{RX}$ based on the potential information of the display driving signal $v_{COM}$ of the display driving unit 5. According to the first embodiment of the present disclosure, the potentials of the touch driving signal $v_{TX}$ and the touch detection signal $v_{RX}$ are dynamically adjusted by using the potential of the display driving signal $v_{COM}$ as the valley potential reference potential. The display driving signal $v_{COM}$ is a dynamic level, for example, a square wave signal, controlled by an external signal.

Figure 5:
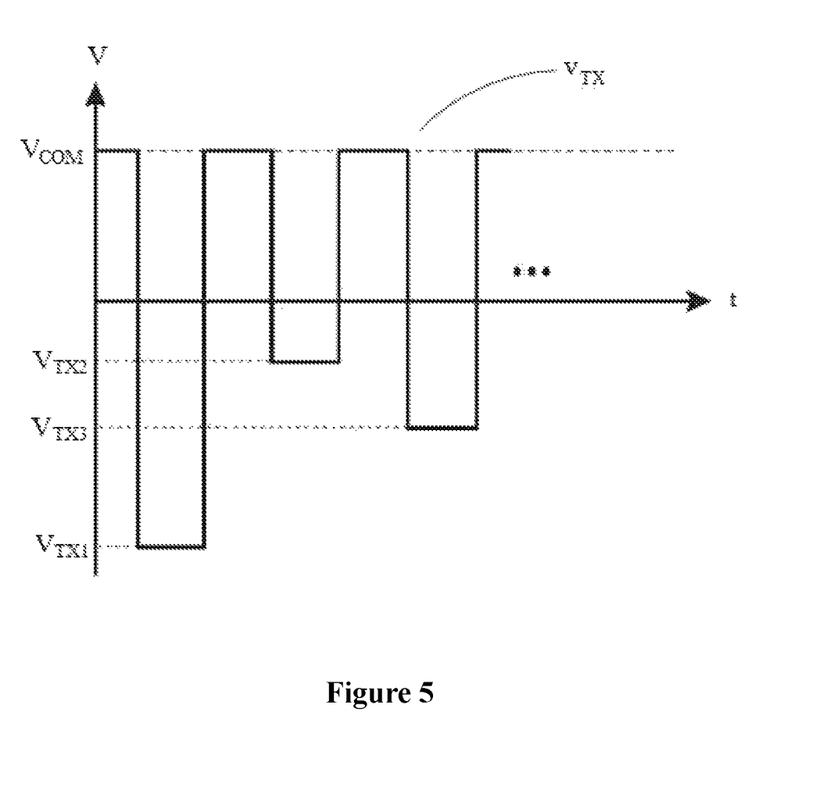
FIG. 5 is a schematic diagram showing a waveform of a touch driving signal $v_{TX}$ when using a display driving signal $v_{COM}$ as a peak potential reference potential according to the present disclosure.
Figure 6:
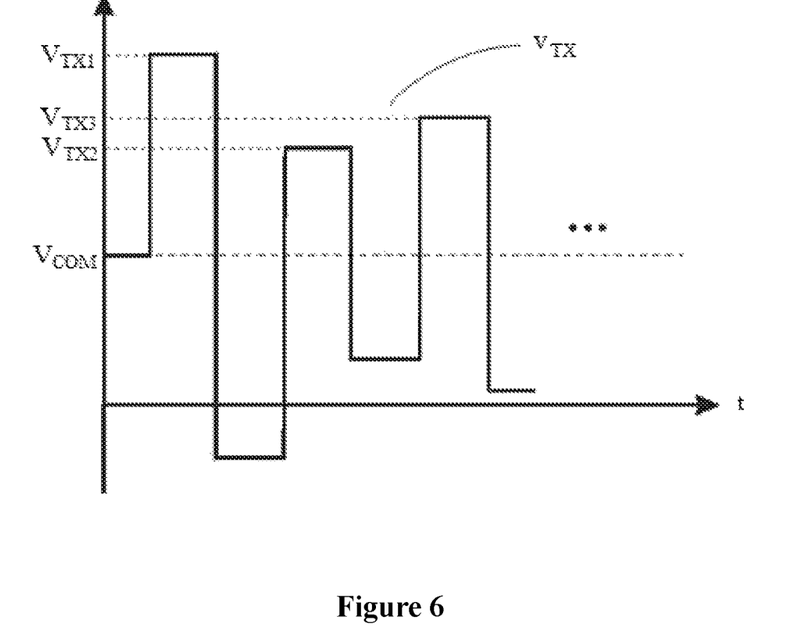
FIG. 6 is a schematic diagram showing a waveform of a touch driving signal $v_{TX}$ when using a display driving signal $v_{COM}$ as an intermediate potential reference potential according to the present disclosure.

Apparently, the touch driving signal $v_{TX}$ may also be dynamically adjusted based on the potential of the display driving signal $v_{COM}$ in other ways. In a case that the touch driving signal $v_{TX}$ is dynamically adjusted by using the potential of the display driving signal $v_{COM}$ as the peak potential reference potential, the touch driving signal $v_{TX}$ is as shown in FIG. 5, that is, the potentials of the touch driving signal $v_{TX}$ and the touch detection signal $v_{RX}$ are dynamically adjusted by using the potential of the display driving signal $v_{COM}$ as the peak potential reference potential. In a case that the touch driving signal $v_{TX}$ is dynamically adjusted by using the potential of the display driving signal $v_{COM}$ as the intermediate potential reference potential, the touch driving signal $v_{TX}$ is as shown in FIG. 6, that is, the potentials of the touch driving signal $v_{TX}$ and the touch detection signal $v_{RX}$ are dynamically adjusted by using the potential of the display driving signal $v_{COM}$ as the intermediate potential reference potential.

Referring to the first embodiment of the present disclosure, with the potential information data channel $INF_V$, the display driving unit 5 can dynamically adjust the potential of the display driving signal $v_{COM}$ based on the potentials of the touch driving signal $v_{TX}$ and the touch detecting signal $v_{RX}$ of the touch driving detecting unit 2.

According to the present disclosure, the touch signal $v_{TX}$ may be in many signal forms, the touch signal $v_{TX}$ may be a square wave signal, a sine wave signal, or a composite sine wave signal including a triangular wave signal. The peak values or valley values of the touch driving signal $v_{TX}$ are the driving potentials, that is, each driving potential may be a peak value or a valley value.

In the case where the touch module 3 in the present disclosure is a mutual-capacitance touch module based on the mutual-capacitance principle, the touch electrode unit 1 is a mutual-capacitance touch electrode unit which constructs a mutual-capacitance touch sensitive region based on the mutual-capacitance principle, the touch electrode unit 1 includes one or more touch electrodes, and each of the touch electrodes is configured to form a touch capacitor, the touch detection signal $v_{RX}$ is used to detect a signal quantity of the touch driving signal $v_{TX}$ after the touch driving signal is coupled by the touch capacitor. In addition, in the case where the touch module 3 in the present disclosure is a self-capacitance touch module based on the self-capacitance principle, the touch electrode unit is a self-capacitance touch electrode unit which constructs a self-capacitance touch sensitive region based on the self-capacitance principle, the touch electrode unit includes at least one touch electrode, the touch detection signal $v_{RX}$ is used to detect a signal quality of the touch driving signal $v_{TX}$ after a touch capacitor is charged and discharged by the touch driving signal $v_{TX}$.

A touch display screen 7 configured to implement the touch driving detection method is further provided according to the present disclosure. As shown in FIG. 1, the touch display screen 7 includes a touch module 3 and a display module 6. The touch module 3 includes a touch electrode unit 1 configured to construct a capacitive touch sensitive region and a touch driving detection unit 2 electrically connected with the touch electrode unit 1. A touch signal for acquiring a change in capacitance is transmitted between the touch driving detection unit 2 and the touch electrode unit 1. The display module 6 includes a display electrode unit 4 configured to implement an image display and a display driving unit 5 electrically connected with the display electrode unit. The display driving unit 5 transmits a display driving signal to the display electrode unit 4. The display driving unit 5 is electrically connected with the touch driving detection unit 2 to establish a data channel $INF_V$ for transmitting potential information, such that the touch driving detection unit 2 can dynamically adjust a potential of the touch signal based on the potential information of the display driving signal $v_{COM}$ of the display driving unit 5, or the display driving unit 5 can dynamically adjust a potential of the display driving signal $v_{COM}$ based on the potential information of the touch signal of the touch driving detecting unit 2. Timing sequence information SEQ is also transmitted between the touch driving detection unit 2 and the display driving unit 5. The touch driving detection method according to the present disclosure can be implemented by the hardware structure of the touch display screen 7.

According to the second embodiment to the fifth embodiment of the present disclosure, the touch driving detection unit 2 is an integrated circuit chip provided independently or a portion of an integrated circuit provided in an integrated circuit chip. Similarly, the display driving unit 5 is an integrated circuit chip provided independently or a portion of an integrated circuit provided in an integrated circuit chip.

According to the second embodiment to the fifth embodiment of the present disclosure, the display driving unit 5 and the touch driving detection unit 2 are electrically connected with each other through analog signal interfaces of the display driving unit 5 and the touch driving detection unit 2, to establish an analog data channel $INF_V$ for transmitting potential information. As another implementation, the display driving unit 5 and the touch driving detection unit 2 are electrically connected with each other through digital signal interfaces of the display driving unit 5 and the touch driving detection unit 2, to establish a digital data channel $INF_V$ for transmitting potential information. The digital signal interface includes an inter-integrated circuit bus interface (simply referred to as an IIC bus interface or an $I^2C$ bus interface), a universal serial bus interface (simply referred to as a USB interface), and a serial peripheral interface (simply referred to as a SPI).

Figure 7:
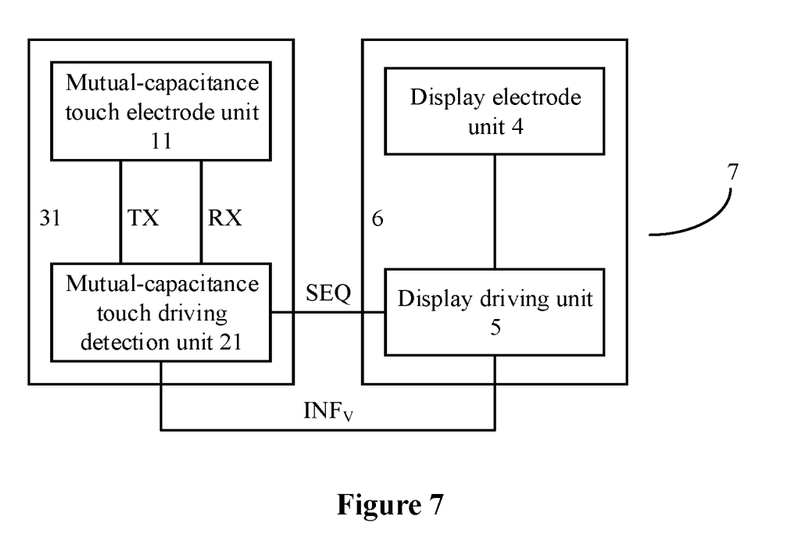
FIG. 7 is a schematic block diagram showing a circuit principle according to a second embodiment of the present disclosure.

According to the second embodiment of the present disclosure, as shown in FIG. 7, the touch module 3 is a mutual-capacitance touch module 31 based on the mutual-capacitance principle. The touch electrode unit 1 is a mutual-capacitance touch electrode unit 11 which constructs a mutual-capacitive touch sensitive region based on the mutual-capacitance principle. The touch driving detection unit 2 is a mutual-capacitance touch driving detection unit 21. The touch signal includes a touch driving signal $v_{TX}$ and a touch detection signal $v_{RX}$. The mutual-capacitance touch driving detection unit 21 is electrically connected with the mutual-capacitance touch electrode unit 11 through the driving electrode channel TX and the sensing electrode channel RX. The driving electrode channel TX transmits the touch driving signal $v_{TX}$, and the sensing electrode channel RX transmits the touch detection signal $v_{RX}$.

Figure 8:
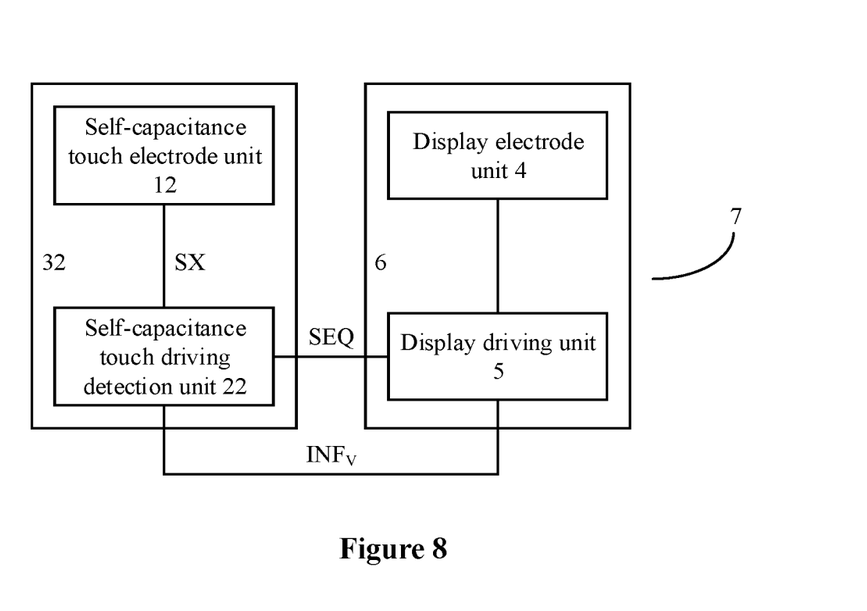
FIG. 8 is a schematic block diagram showing a circuit principle according to a third embodiment of the present disclosure.

According to the third embodiment of the present disclosure, as shown in FIG. 8, the touch module 3 is a self-capacitance touch module 32 based on the self-capacitance principle. The touch electrode unit 1 is a self-capacitance touch electrode unit 12 which constructs a self-capacitance touch sensitive region based on the self-capacitance principle. The touch driving detection unit 2 is a self-capacitance touch driving detection unit 22. The touch signal includes a touch driving signal $v_{TX}$. The self-capacitance touch driving detection unit 22 is electrically connected with the self-capacitance touch electrode unit 12 through the self-capacitance electrode channel SX. The touch driving signal $v_{TX}$ is transmitted through the self-capacitance electrode channel SX in a time-sharing manner. The self-capacitance variation information of the self-capacitance touch electrode unit 12 is acquired by detecting electric characteristic change information of the electrode of the self-capacitance touch electrode unit 12 after the touch driving signal $v_{TX}$ is applied to the electrode.

Figure 9:
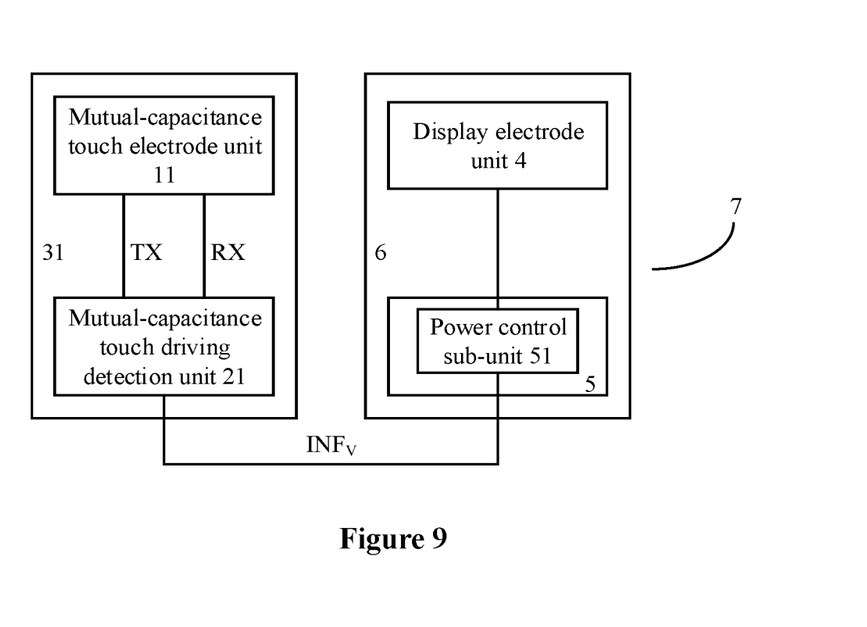
FIG. 9 is a schematic block diagram showing a circuit principle according to a forth embodiment of the present disclosure.
Figure 10:
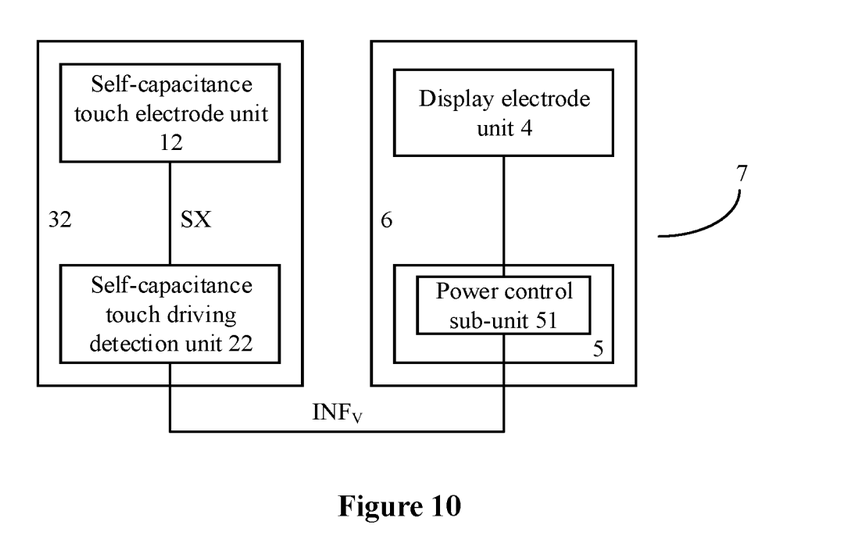
FIG. 10 is a schematic block diagram showing a circuit principle according to a fifth embodiment of the present disclosure.

The display driving unit 5 includes a power control sub-unit 51 electrically connected with the display electrode unit 4. The power control sub-unit 51 is configured to provide the display driving signal $v_{COM}$ to the display electrode unit 4. The power control sub-unit 51 is electrically connected with the touch driving detection unit 2 to establish a data channel $INF_V$ for transmitting potential information. According to the fourth embodiment of the present disclosure, as shown in FIG. 9, the power control sub-unit 51 is used on the basis of the mutual-capacitance touch module 31 in the second embodiment to establish the data channel $INF_V$ for transmitting potential information. According to the fifth embodiment of the present disclosure, as shown in FIG. 10, the power control sub-unit 51 is used on the basis of the self-capacitance touch module 32 in the third embodiment to establish the data channel $INF_V$ for transmitting potential information.

According to the fourth embodiment and the fifth embodiment of the present disclosure, the power control sub-unit 51 and the touch driving detection unit 2 are electrically connected with each other through analog signal interfaces of the power control sub-unit 51 and the touch driving detection unit 2 to establish an analog data channel $INF_V$ for transmitting potential information. As another interface implementation solution, the power control sub-unit 51 and the touch driving detection unit 2 are electrically connected with each other through digital signal interfaces of the power control sub-unit 51 and the touch driving detection unit 2 to establish a digital data channel $INF_V$ for transmitting potential information. The digital signal interface includes an IIC bus interface, a USB interface, and an SPI.

According to the second embodiment to the fifth embodiment of the present disclosure, an AMOLED touch display screen is constructed based on the above solution of the present disclosure. The touch display screen 7 further includes a thin film package layer. The display module 6 is an active matrix organic light emitting diode (AMOLED) display module and further includes a display medium layer and a display thin film transistor (TFT) electrode substrate. The touch electrode unit 1 and the display electrode unit 4 are stacked, and the thin film package layer is arranged between the touch electrode unit 1 and the display electrode unit 4. The display driving signal $v_{COM}$ is a voltage received by a cathode or an anode of the display medium layer.

Figure 11:
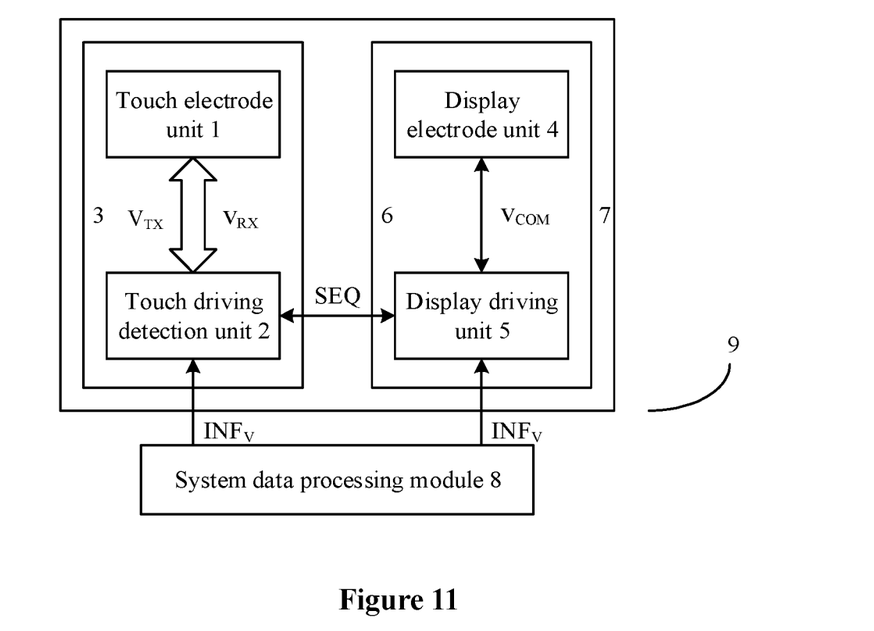
FIG. 11 is a schematic block diagram showing a circuit principle of a system for configuring a touch display screen according to the present disclosure.

A system 9 for configuring the touch display screen 7 is further provided according to the present disclosure. The system 9 may be a hardware structure system of an electrical device such as a mobile communication device, a camera/video device, a video/audio play device, a personal computer device or a tablet computer device. As shown in FIG. 11, the system 9 includes a touch display screen 7. The touch display screen 7 includes a touch module 3 and a display module 6. The touch module 3 includes a touch electrode unit 1 configured to construct a capacitive touch sensitive region and a touch driving detection unit 2 electrically connected with the touch electrode unit 1. A touch signal for acquiring a change in capacitance is transmitted between the touch driving detection unit 2 and the touch electrode unit 1. The display module 6 includes a display electrode unit 4 configured to implement an image display and a display driving unit 5 electrically connected with the display electrode unit 4. The display driving unit 5 transmits the display driving signal $v_{COM}$ to the display electrode unit 4. The system 9 further includes a system data processing module 8 electrically connected with the touch driving detection unit 2 and the display driving unit 5 to establish a data channel $INF_V$ for transmitting potential information, such that the touch driving detection unit 2 can dynamically adjust the potential of the touch signal based on the potential information of the display driving signal $v_{COM}$ of the display driving unit 5, or, the display driving unit 5 can dynamically adjust the potential of the display driving signal $v_{COM}$ based on the potential information of the touch signal of the touch driving detection unit 2. Timing sequence information SEQ is also transmitted between the touch driving detection unit 2 and the display driving unit 5. With the hardware structure of the touch display screen 7 based on the system 9, in particular with the data channels $INF_V$ for transmitting potential information established between the touch driving detection unit 2 and the system data processing module 8 and established between the display driving unit 5 and the system data processing module 8, the touch driving detection method according to the present disclosure can be implemented.

According to the sixth embodiment and the seventh embodiment of the present disclosure, the touch driving detection unit 2 is an integrated circuit chip provided independently or a portion of an integrated circuit provided in an integrated circuit chip. Similarly, the display driving unit 5 is an integrated circuit chip provided independently or a portion of an integrated circuit provided in an integrated circuit chip.

Figure 12:
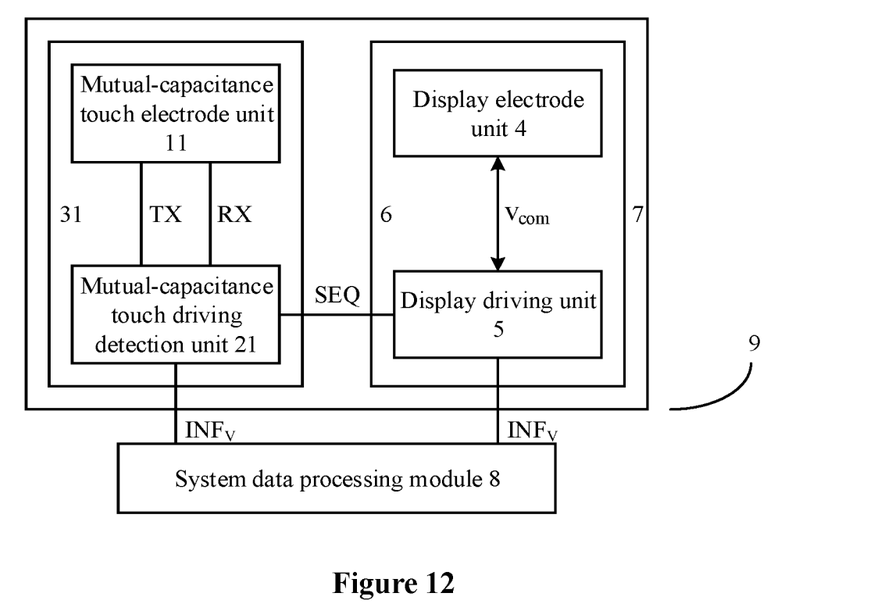
FIG. 12 is a schematic block diagram showing a circuit principle according to a sixth embodiment of the present disclosure.

According to the sixth embodiment of the present disclosure, as shown in FIG. 12, the touch module 3 is a mutual-capacitance touch module 31 based on the mutual-capacitance principle. The touch electrode unit 1 is a mutual-capacitance touch electrode unit 11 which constructs a mutual-capacitance touch sensitive region based on the mutual-capacitance principle. The touch driving detection unit 2 is a mutual-capacitance touch driving detection unit 21. The touch signal includes a touch driving signal $v_{TX}$ and a touch detection signal $v_{RX}$. The mutual-capacitance touch driving detection unit 21 is electrically connected with the mutual-capacitance touch electrode unit 11 through the driving electrode channel TX and the sensing electrode channel RX. The driving electrode channel TX transmits the touch driving signal $v_{TX}$, and the sensing electrode channel RX transmits the touch detection signal $v_{RX}$.

Figure 13:
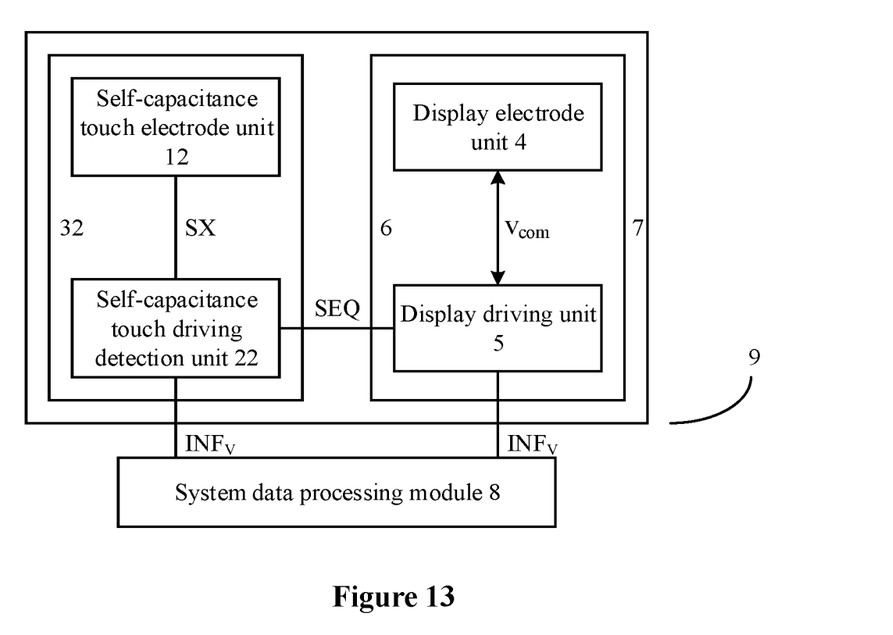
FIG. 13 is a schematic block diagram showing a circuit principle according to a seventh embodiment of the present disclosure.

According to the seventh embodiment of the present disclosure, as shown in FIG. 13, the touch module 3 is a self-capacitance touch module 32 based on the self-capacitance principle. The touch electrode unit 1 is a self-capacitance touch electrode unit 12 which constructs a self-capacitance touch sensitive region based on the self-capacitance principle. The touch driving detection unit 2 is a self-capacitance touch driving detection unit 22. The touch signal includes a touch driving signal $v_{TX}$. The self-capacitance touch driving detection unit 22 is electrically connected with the self-capacitance touch electrode unit 12 through the self-capacitance electrode channel SX. The touch driving signal v is transmitted through the self-capacitance electrode channel SX in a time-sharing manner. The self-capacitance variation information of the self-capacitance touch electrode unit 12 is acquired by detecting electric characteristic change information of the electrode of the self-capacitance touch electrode unit 12 after the touch driving signal $v_{TX}$ is applied to the electrode.

According to the sixth embodiment and the seventh embodiment of the present disclosure, the display driving unit 5 and the system data processing module 8 are electrically connected with each other through first signal interfaces of the display driving unit 5 and the system data processing module 8, and the touch driving detection unit 2 and the system data processing module 8 are electrically connected with each other through second signal interfaces of the touch driving detection unit 2 and the system data processing module 8, to establish a data channel $INF_V$ for transmitting potential information. Each of the first signal interfaces is an analog signal interface or a digital signal interface, and each of the second signal interfaces is an analog signal interface or a digital signal interface. The digital signal interface includes an IIC bus interface, a USB interface, and an SPI.

According to the sixth embodiment and the seventh embodiment of the present disclosure, the AMOLED touch display screen is constructed according to the above solution of the present disclosure. The touch display screen 7 further includes a thin film package layer. The display module 6 is an active matrix organic light emitting diode (AMOLED) display module and further includes a display medium layer and a display thin film transistor (TFT) electrode substrate. The touch electrode unit 1 and the display electrode unit 4 are stacked, and the thin film package layer is arranged between the touch electrode unit 1 and the display electrode unit 4.

The invention claimed is:

1. A touch driving detection method based on a touch display screen,
    the touch display screen comprising:
        a touch module comprising:
            a touch electrode unit configured to construct a capacitive touch sensitive region; and
            a touch driving detection unit configured to acquire a signal from the touch electrode unit and process the signal, wherein
            a touch signal for acquiring a change in capacitance is transmitted between the touch driving detection unit and the touch electrode unit, and
        a display module comprising:
            a display electrode unit configured to implement an image display; and
            a display driving unit configured to drive the display electrode unit, wherein
            the display driving unit transmits a display driving signal to the display electrode unit, and
    the touch driving detection method comprising:
        establishing a potential information data channel between the touch driving detection unit and the display driving unit, wherein
        the touch driving detection unit dynamically adjusts a potential level of the touch signal based on potential information of the display driving signal of the display driving unit, or,
        the display driving unit dynamically adjusts a potential level of the display driving signal based on potential information of the touch signal of the touch driving detection unit.

2. The touch driving detection method based on a touch display screen according to claim 1, wherein,
    the touch module is a mutual-capacitance touch module based on a mutual-capacitance principle, and the touch signal comprises a touch driving signal and a touch detection signal; or
    the touch module is a self-capacitance touch module based on a self-capacitance principle, and the touch signal comprises a touch driving signal.

3. The touch driving detection method based on a touch display screen according to claim 2, wherein the touch driving signal comprises at least two driving potentials, and a predefined potential difference is set between any two of the driving potentials.

4. The touch driving detection method based on a touch display screen according to claim 3, wherein
    the touch driving signal is a square wave signal, a sine wave signal, or a composite sine wave signal comprising a triangular wave signal, and
    peak values or valley values of the touch driving signal are the driving potentials.

5. The touch driving detection method based on a touch display screen according to claim 1, wherein
    the potential level of the touch signal is dynamically adjusted by using the potential of the display driving signal as a peak potential reference potential; or
    the potential level of the touch signal is dynamically adjusted by using the potential of the display driving signal as an intermediate potential reference potential; or
    the potential level of the touch signal is dynamically adjusted by using the potential of the display driving signal as a valley potential reference potential.

6. The touch driving detection method based on a touch display screen according to claim 2, wherein the potential level of the touch signal is dynamically adjusted by using the potential of the display driving signal as a peak potential reference potential; or the potential level of the touch signal is dynamically adjusted by using the potential of the display driving signal as an intermediate potential reference potential; or the potential level of the touch signal is dynamically adjusted by using the potential of the display driving signal as a valley potential reference potential.

7. The touch driving detection method based on a touch display screen according to claim 3, wherein the potential level of the touch signal is dynamically adjusted by using the potential of the display driving signal as a peak potential reference potential; or the potential level of the touch signal is dynamically adjusted by using the potential of the display driving signal as an intermediate potential reference potential; or the potential level of the touch signal is dynamically adjusted by using the potential of the display driving signal as a valley potential reference potential.

8. The touch driving detection method based on a touch display screen according to claim 4, wherein the potential level of the touch signal is dynamically adjusted by using the potential of the display driving signal as a peak potential reference potential; or the potential level of the touch signal is dynamically adjusted by using the potential of the display driving signal as an intermediate potential reference potential; or the potential level of the touch signal is dynamically adjusted by using the potential of the display driving signal as a valley potential reference potential.

9. The touch driving detection method based on a touch display screen according to claim 2, wherein the touch module is the mutual-capacitance touch module based on the mutual-capacitance principle, the touch electrode unit is a mutual-capacitance touch electrode unit which constructs a mutual-capacitance touch sensitive region based on the mutual-capacitance principle, the touch electrode unit comprises one or more touch electrodes, each of the touch electrodes is configured to form a touch capacitor, and the touch detection signal is used to detect a signal quantity of the touch driving signal after the touch driving signal is coupled by the touch capacitor; or the touch module is the self-capacitance touch module based on the self-capacitance principle, the touch electrode unit is a self-capacitance touch electrode unit which constructs a self-capacitance touch sensitive region based on the self-capacitance principle, the touch electrode unit comprises one or more touch electrodes, and the touch detection signal is used to detect a signal quantity of the touch driving signal after a touch capacitor is charged and discharged by the touch driving signal.

10. A touch display screen, comprising:

a touch module comprising:

a touch electrode unit configured to construct a capacitive touch sensitive region; and a touch driving detection unit electrically connected with the touch electrode unit, wherein a touch signal for acquiring a change in capacitance is transmitted between the touch driving detection unit and the touch electrode unit, and a display module comprising:

a display electrode unit configured to implement an image display; and a display driving unit electrically connected with the display electrode unit, wherein the display driving unit transmits a display driving signal to the display electrode unit, wherein the display driving unit is electrically connected with the touch driving detection unit to establish a data channel for transmitting potential information, and the touch driving detection unit dynamically adjusts a potential level of the touch signal based on potential information of the display driving signal of the display driving unit, or, the display driving unit dynamically adjusts a potential level of the display driving signal based on potential information of the touch signal of the touch driving detection unit.

11. The touch display screen according to claim 10, wherein the display driving unit comprises a power control sub-unit electrically connected with the display electrode unit and configured to provide the display driving signal to the display electrode unit, and the power control sub-unit is further electrically connected with the touch driving detection unit to establish the data channel for transmitting potential information.

12. The touch display screen according to claim 10, wherein the touch driving detection unit is an integrated circuit chip provided independently or a portion of an integrated circuit provided in an integrated circuit chip, and the display driving unit is an integrated circuit chip provided independently or a portion of an integrated circuit provided in an integrated circuit chip.

13. The touch display screen according to claim 10, wherein the touch module is a mutual-capacitance touch module based on a mutual-capacitance principle, the touch electrode unit is a mutual-capacitance touch electrode unit which constructs a mutual-capacitance touch sensitive region based on the mutual-capacitance principle, the touch driving detection unit is a mutual-capacitance touch driving detection unit, and the touch signal comprises a touch driving signal and a touch detection signal; or the touch module is a self-capacitance touch module based on a self-capacitance principle, the touch electrode unit is a self-capacitance touch electrode unit which constructs a self-capacitance touch sensitive region based on the self-capacitance principle, the touch driving detection unit is a self-capacitance touch driving detection unit, and the touch signal comprises a touch driving signal.

14. The touch display screen according to claim 10, wherein the display driving unit and the touch driving detection unit are electrically connected with each other through analog signal interfaces of the display driving unit and the touch driving detection unit, to establish an analog data channel for transmitting potential information; or the display driving unit and the touch driving detection unit are electrically connected with each other through digital signal interfaces of the display driving unit and the touch driving detection unit, to establish a digital data channel for transmitting potential information.

15. The touch display screen according to claim 10, further comprising a thin film package layer, wherein
the display module is an active matrix organic light emitting diode display module and further comprises a display medium layer and a display thin film transistor electrode substrate, and
the touch electrode unit and the display electrode unit are stacked, and the thin film package layer is arranged between the touch electrode unit and the display electrode unit.

16. A system for configuring a touch display screen, comprising:
the touch display screen comprising:
a touch module comprising:
a touch electrode unit configured to construct a capacitive touch sensitive region; and
a touch driving detection unit electrically connected with the touch electrode unit, wherein
a touch signal for acquiring a change in capacitance is transmitted between the touch driving detection unit and the touch electrode unit, and
a display module comprising:
a display electrode unit configured to implement an image display; and
a display driving unit electrically connected with the display electrode unit, wherein
the display driving unit transmits a display driving signal to the display electrode unit, and
a system data processing module electrically connected with the touch driving detection unit and the display driving unit to establish a data channel for transmitting potential information, wherein
the touch driving detection unit dynamically adjusts a potential level of the touch signal based on potential information of the display driving signal of the display driving unit, or,
the display driving unit dynamically adjusts a potential level of the display driving signal based on potential information of the touch signal of the touch driving detection unit.

17. The system for configuring a touch display screen according to claim 16, wherein
the touch driving detection unit is an integrated circuit chip provided independently or a portion of an integrated circuit provided in an integrated circuit chip, and
the display driving unit is an integrated circuit chip provided independently or a portion of an integrated circuit provided in an integrated circuit chip.

18. The system for configuring a touch display screen according to claim 16, wherein
the touch module is a mutual-capacitance touch module based on a mutual-capacitance principle, the touch electrode unit is a mutual-capacitance touch electrode unit which constructs a mutual-capacitance touch sensitive region based on the mutual-capacitance principle, the touch driving detection unit is a mutual-capacitance touch driving detection unit, and the touch signal comprises a touch driving signal and a touch detection signal; or
the touch module is a self-capacitance touch module based on a self-capacitance principle, the touch electrode unit is a self-capacitance touch electrode unit which constructs a self-capacitance touch sensitive region based on the self-capacitance principle, the touch driving detection unit is a self-capacitance touch driving detection unit, and the touch signal comprises a touch driving signal.

19. The system for configuring a touch display screen according to claim 16, wherein
the display driving unit and the system data processing module are electrically connected with each other through first signal interfaces of the display driving unit and the system data processing module, and the touch driving detection unit and the system data processing module are electrically connected with each other through second signal interfaces of the touch driving detection unit and the system data processing module, to establish the data channel for transmitting potential information;
each of the first signal interfaces is an analog signal interface or a digital signal interface; and
each of the second signal interfaces is an analog signal interface or a digital signal interface.

20. The system for configuring a touch display screen according to claim 16, wherein
the touch display screen further comprises a thin film package layer,
the display module is an active matrix organic light emitting diode display module and further comprises a display medium layer and a display thin film transistor electrode substrate, and
the touch electrode unit and the display electrode unit are stacked, and the thin film package layer is arranged between the touch electrode unit and the display electrode unit.

* * * * *